March 25, 1969  N. M. SHUKLA ET AL  3,434,581
POSITION DETECTOR

Original Filed July 2, 1965  Sheet 1 of 2

*INVENTORS*
NARENDRA M. SHUKLA
JAG MOHAN GARG

*Vincent L. Carney*
ATTORNEY

INVENTORS
NARENDRA M. SHUKLA
JAG MOHAN GARG

BY *Vincent L. Carney*

ATTORNEY

United States Patent Office 3,434,581
Patented Mar. 25, 1969

3,434,581
POSITION DETECTOR
Narendra M. Shukla, 651 Delaware, and Jag Mohan Garg, 681 Merrick, both of Detroit, Mich. 48202
Continuation of application Ser. No. 667,011, Sept. 11, 1967, which is a continuation of application Ser. No. 474,202, July 2, 1965. This application Apr. 26, 1968, Ser. No. 724,641
Int. Cl. B41j 29/42, 19/00, 25/18
U.S. Cl. 197—187                                    6 Claims

ABSTRACT OF THE DISCLOSURE

An apparatus for determining the position of and the direction of movement of an object with respect to a transducer having a pair of ferrite cores which are prevented from switching by the field from a permanent magnet having its poles aligned with the cores. A group of spaced permeable shunts on the moveable object deflect the magnetic field away from the cores allowing them to change remanent magnetic states under the influence of a driving pulse. The order of switching of the cores and the number of times the cores switch indicates the direction of movement and the distance moved or position of the body.

---

This application is a continuation of copending application Ser. No. 667,011 filed Sept. 11, 1967, now abandoned, which in turn was a continuation of application Ser. No. 474,202 filed July 2, 1965, now abandoned.

This invention relates to sensing apparatus, and more particularly, to apparatus for determining the relative position of one body to another.

It is frequently desirable to sense the location of a moving object. For example, in computers, detectable indicia is frequently recorded on an object, and later detected to determine the location of that part of the object with the recorded indicia on it. The computer frequently controls the location of a movable carriage for a readout mechanism. In such a case the computer must be able to determine the location of the carriage in order to provide character printing information to other parts of the readout apparatus.

The transducers used to sense the location of the moving object must be reliable and inexpensive. They should also not be overly sensitive to the perpendicular distance between a moving object and the stationary object used as a reference but should be sensitive to the angular displacement between the moving object and the stationary object. Since a computer may have to determine the direction of motion of the moving object, the transducer should be bidirectional. It should also be capable of static readout so as to have the capability of continually determining the status of the object. Frequently it is also required that the transducer not be velocity sensitive, but instead be displacement sensitive. Accordingly, it is an object of this invention to provide an improved position detecting device.

It is a further object of this invention to provide a simple, reliable position detector which is bidirectional and capable of static readout.

It is a further object of this invention to provide a position detector in which a transducer senses the presence of any one of a plurality of objects positioned on a body that is moving relative to the transducer without causing undue wear to either the transducer or to the plurality of detected objects.

In accordance with the above purposes, apparatus for determining the position of an object such as a printer-carrier with respect to another object such as the platen of a printer is provided, which apparatus includes a simple magnetic transducer positioned on the carrier, a plurality of markers on the platen, which markers are capable of being sensed by the magnetic transducer, and a counting circuit for continually recording the position of the carrier with respect to the platen by counting in the proper direction the number of markers which have passed the transducer.

The magnetic transducer includes a permanent magnet having a north pole at one end and a south pole at the other end, a first magnetic core positioned near the north pole of the magnet, a second magnetic core positioned near the south pole of the magnet, and a magnetic coupling unit positioned close to both of said magnetic cores. The flux from the north pole of the permanent magnet passes through an air gap to the first magnetic core, through a second air gap to the magnetic coupling member, through a third air gap to the second core, and through a fourth air gap to the south pole of the permanent magnet to form a complete flux circuit. Each of the magnetic cores has a driver winding which is capable of switching the cores periodically from one state of magnetic remanence to the other and also an output winding which has an output voltage induced in it each time its corresponding magnetic core changes its remanent magnetic state. However, the flux from the permanent magnet normally prevents the cores from switching.

The marking members pass between the permanent magnet and the magnetic coupling member so as to shunt the magnetic field from the permanent magnet around one core at a time in the magnetic circuit described above. Whenever the magnetic field is shunted around a core, an output voltage is provided to the output winding of that core indicating the position of the shunt with respect to the core. If a shunting marker is not next to a core, the core does not change magnetic states under the influence of the AC driving current on its driving winding.

The counter records the number of shunting markers that pass the magnetic transducer to determine the position of the platen bearing the shunting markers to the carrier bearing the magnetic transducer. The two cores of the magnetic transducer are spaced apart a distance which is different from the distance that the shunting markers are spaced from each other. This causes the output pulses from the two cores to have a time relationship with respect to each other, which time relationship depends on the direction of motion of the shunting markers with respect to the magnetic transducer. Accordingly, this relationship determines the direction in which the counter counts and responds to pulses from the cores of the magnetic transducer.

The invention and the above noted and other features thereof will be understood more clearly and fully from the detailed description when considered with reference to the accompanying drawings in which.

Figure 1:
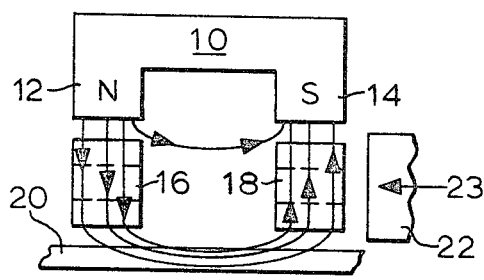
FIG. 1 is a diagrammatic sketch of the magnetic transducer which may be used in an embodiment of the invention.

In FIG. 1 a permanent magnet 10 is shown having a north pole 12 adjacent to a first magnetic core 16 and a south pole 14 adjacent to a second magnetic core 18. The magnetic cores 16 and 18 may be ferrite cores of the type frequently used in coincident current memories or in magnetic switching circuitry. A thorough discussion of these cores is presented in "Digital Applications of Magnetic Devices" by Meyerhoff, Barnes, Disson and Lund, John Wiley and Sons, Inc., New York, N.Y., 1960. An elongated low-reluctance coupling member 20 is positioned close to the core 16 at one point on the coupling member and close to the core 18 at another point on the coupling member.

A magnetic flux circuit is formed in which the flux passes from the pole 12 of the permanent magnet 10 to the core 16, from the core 16 to the coupling member 20, from the coupling member 20 to the core 18, and from the core 18 to the pole 14 of the permanent magnet, forming a complete circuit. The coupling member 20 should be a low reluctance material, preferably ferrous in nature.

A shunting member 22 is positioned so that if it is moved laterally in a direction indicated by the arrow 23 it passes first between the pole 14 and the coupling member 20 and then passes between the pole 12 and the coupling member 20. This shunting member, which is utilized as a marker in the position detector, is also a low reluctance material. Therefore, as it passes between a pole of the permanent magnet 10 and the coupling member 20 adjacent to a magnetic core, the flux which would normally pass through the core between the magnet and the coupling member is shunted away from the core and passes through the shunt instead.

Figure 2:
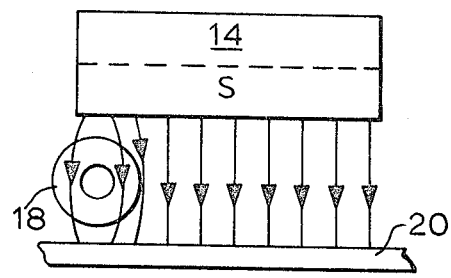
FIG. 2 is a diagrammatic sketch of a portion of said transducer.
Figure 3:
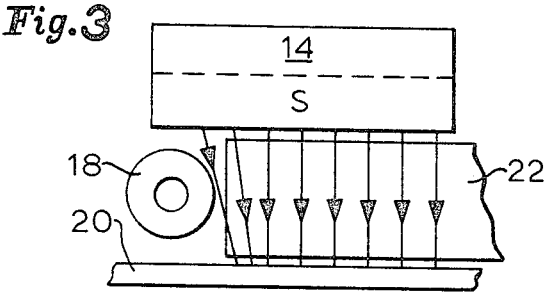
FIG. 3 is a diagrammatic sketch of another portion of said transducer.

This can be seen more clearly in FIGS. 2 and 3 which show a diagrammatic side view of the south pole 14 of the permanent magnet 10, the core 18, and the coupling member 20. In FIG. 2 it can be seen that substantial flux passes between the pole 14 and the return path 20. The pole 14 is larger than the core 18 so as to leave a substantial air gap between the pole 14 and the coupling member 20 next to the core 18. In FIG. 3 it can be seen that the shunt 22 diverts the flux away from the core 18 when it passes between the pole 14 and the coupling member 20. This is true because the shunt 22 has a lower reluctance than the core 18. The core 18 is inhibited from switching from one state to the other when flux passes through it as shown in FIG. 2, but can be switched by a current applied to an input winding (shown in FIG. 7) if the flux is shunted around the core as in FIG. 3.

Figure 4:
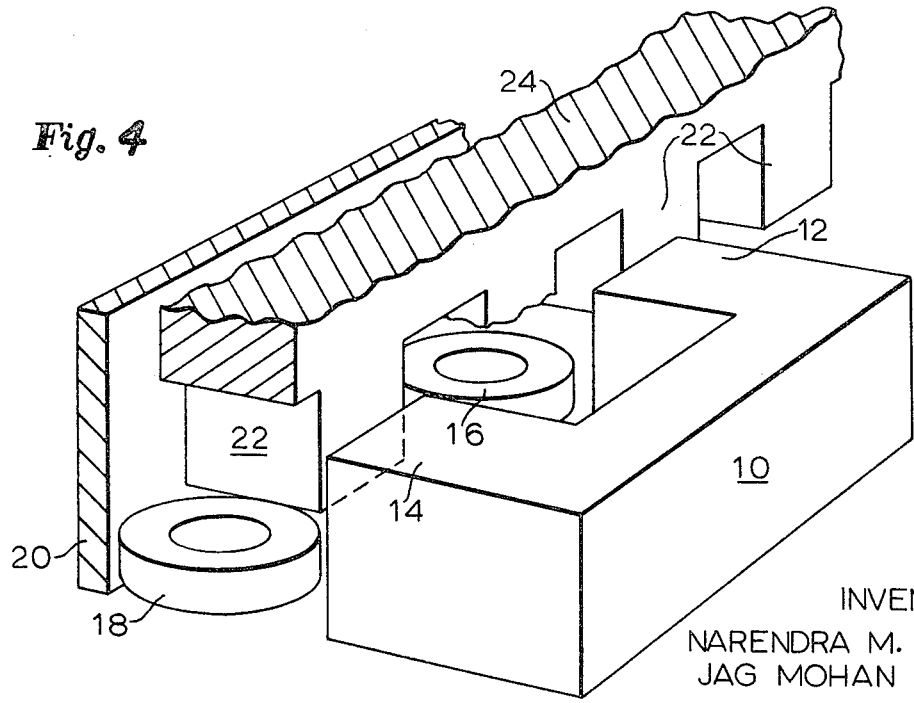
FIG. 4 is a perspective drawing of said transducer and shunt markers.

In FIG. 4 a perspective drawing of the permanent magnet 10 having pole pieces 12 and 14 is shown. The cores 16 and 18 are shown positioned near the pole pieces 12 and 14 respectively. In FIG. 4 these cores are placed at a different angle to that shown in FIGS. 1 through 3 for illustration. However, the device is operable with the cores positioned in this manner just as it is with the cores positioned at any other angle with respect to the permanent magnet. The coupling member 20 is shown forming a return path for the flux from one pole of the magnet 10 to the other. A nonmagnetic marker support 24 is shown holding a plurality of marking shunts 22 positioned between the magnet 10 and the coupling member 20.

The marker support 24 is connected to a body such as the platen of a typewriter and extends longitudinally in the same direction as the axis of the platen. The markers 22 are positioned at equal predetermined distances from each other along the longitudinal axis of the marker support 24 so as to be carried between the magnet 10 and the coupling member 20 as the platen is moved from one side to the other with respect to the transducer 10. The permanent magnet 10, the cores 18 and 16, and the coupling member 20 are all mechanically connected to the printer of the typewriter so as to maintain their position with respect to each other. Frequently the carrier is the moving part of the typewriter and the platen is fixed. Such is the case with the single element type of printer.

Figure 5:
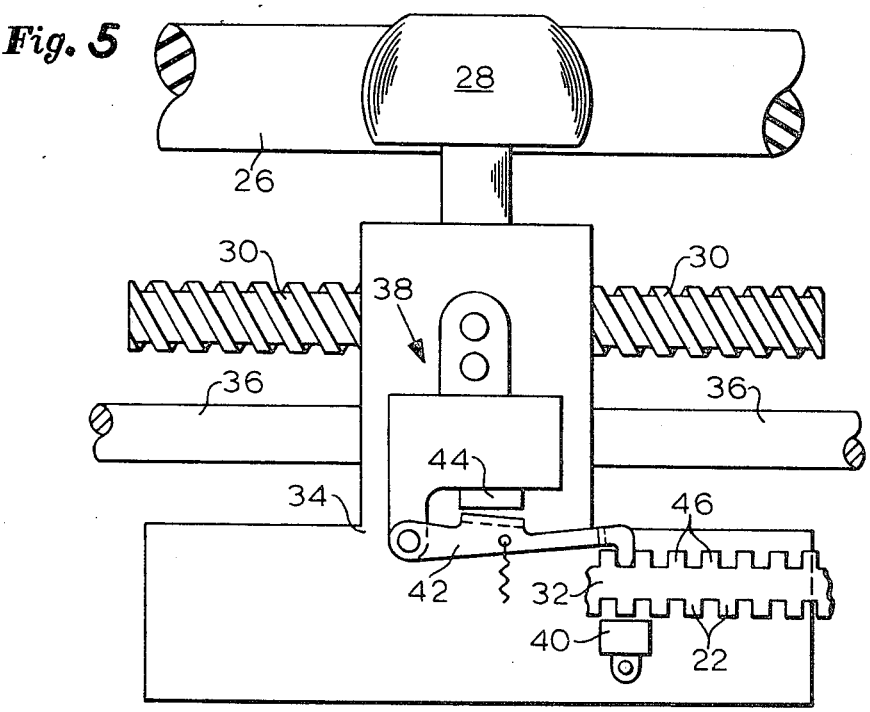
FIG. 5 is a simplified drawing of a character printer and platen bearing the position detector according to the invention.

In FIG. 5 a diagrammatic view of a single element printer is shown having a platen 26 and a single element typing head 28. This type of printing machine is described as part of a complete typewriter in the patent to Palmer et al., No. 2,879,876, issued Mar. 31, 1959.

In our embodiment a screw 30 and a holding rack 32 are all mechanically connected to the frame of the typewriter so as to be fixed in position with respect to the platen 26. A carrier 34 is mounted on a support 36 and driven by the screw 30. As it is driven by the screw 30, it carries the printing head 28, a holding mechanism 38, and a position detector or transducer 40 with it. The holding mechanism 38 contains a pawl 42 which is controlled by a solenoid 44 to engage with the teeth 46 of the rack 32 when released by the solenoid 44 and to be pulled free from the rack 32 when the solenoid 44 is activated. This holding mechanism 38 is used to stop and position the printer carrier accurately with respect to the platen before printing. A suitable motor for driving the screw 30 is described in U.S. Patent No. 3,144,574 to Henry-Baudot. Its speed and direction may be controlled by a motor control unit such as that described in the "IBM Technical Disclosure Bulletin" entitled Reversible Motor Control, vol. 5, No. 12, May 1963.

The bottom side of the rack 32 contains a plurality of shunts 22 which cooperate with the transducer 40 to determine the position of the printing head 28 with respect to the platen 26. This information is utilized by a computer to control the position of the printing head 28.

Figure 6:
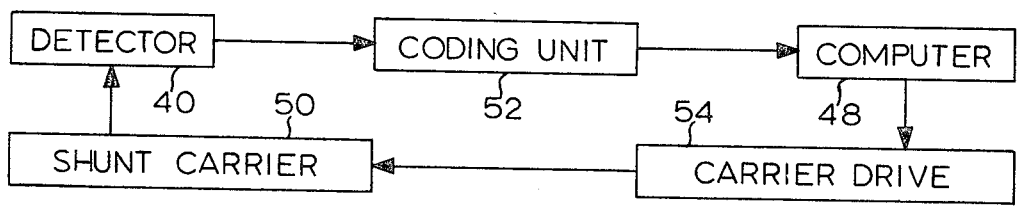
FIG. 6 is a block diagram illustrating the use of the position detector in a computer.

In FIG. 6 a block diagram is shown illustrating the manner in which the transducer 40 of this invention cooperates with a computer 48. The transducer 40 counts the number of shunts on the shunt carrier 50 which pass it in either direction. The transducer 40 conducts a pulse to the coding unit 52 for each shunt that passes it, and also indicates the direction in which the shunt is traveling. The code unit 52, which includes a reversible binary counter, indicates to the computer the location of the carrier with respect to the platen. The computer 48 controls the driving mechanism 54 which, in turn, controls the motion of the shunt carrier with respect to the detector. A separate connection from the computer 48 controls the solenoid 44 (shown in FIG. 5) to raise and lower the pawl into a rack so as to correctly position the character.

Figure 7:
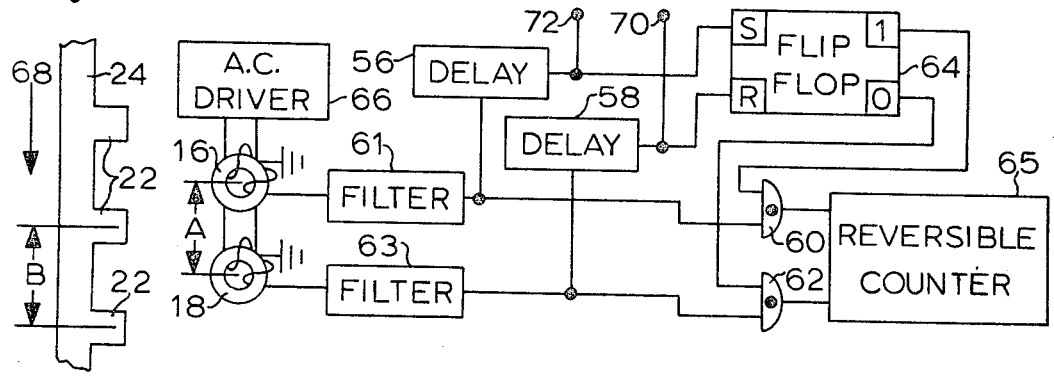
FIG. 7 is a block diagram showing the relationship between the position detector, the counter, and the logic circuitry necessary to connect the position detector to the counter.

The manner in which the transducer 40 is connected to the coding unit 52 is illustrated in FIG. 7 which shows a coding unit in greater detail. The coding unit includes a first delay element 56 and a second delay element 58 electrically connected to the output windings of cores 16 and 18 respectively. The output windings of the cores 16 and 18 are also each connected to a different one of the AND gates 60 and 62 respectively. The connections are made through integrating filters 61 and 63 respectively. The output of the delay line 56 is connected to the set input terminal of a flip-flop 64; the output of the delay 58 is electrically connected to the reset input terminal of this flip-flop. The 1 output terminal of the flip-flop 64 is connected to the other input of the AND gate 60 to open this gate whenever a pulse is received on the set input terminal and the 0 output of the flip-flop 64 is connected to the other input of the AND gate 62 to open this gate whenever a pulse is received on the reset input terminal. The outputs of the AND gates 60 and 62 are also connected to the two inputs of the reversible counter 65 in such a manner that the output from the AND gate 60 causes the counter to count in one direction and the output of the AND gate 62 causes the counter to count in the opposite direction. A shunt support 24 is shown having the shunts 22 spaced apart from each other a distance B which is greater than the distance A between the cores 16 and 18.

The magnet and flux return path for the cores 16 and 18 are not shown in FIG. 7. However, they are substantially as described above. The theory of operation of this transducer is explained more fully in the application for Letters Patent of the United States Ser. No. 433,359, entitled "Tranducer," filed Feb. 17, 1965, in the name of Flavius A. Mathamel and assigned to the same assignee as the present invention.

The AC driver 66 attempts to switch the cores 16 and 18 from one state to the other until one of the shunts 22 is close enough to the core to remove the inhibiting bias from the core. The shunts 22 are positioned midway between the cores 16 and 18 whenever the carriage is at rest. If the support 24 moves downward in the direction indicated by the arrow 68 prior to stopping, the core 18 provides an output pulse to the delay line 58 into the AND gate 62. A short time later the core 16 provides an output pulse to the delay 56 and to the AND gate 60.

It can be seen that as the support 24 moves with respect to the cores, the cores generate pulses in groups of two. If the support 24 moves down, the first pulse in the group is from core 18 and the second pulse from core 16. If the support 24 moves up, the first pulse in the group is from the core 16 and the second pulse is from the core 18. The delays 56 and 58 are longer than the time between the two pulses of the groups of pulses when the carrier is moving at its rated speed.

As the support 24 moves downward, the flip-flop 64 is set when the shunts are approaching the cores 16 and 18. A shunt activates core 18 first generating a pulse which is applied to gate 62 and to the delay 58. Since the flip-flop 64 is in its set condition, the gate 62 is closed so no count is registered by the reversible counter 65. Before the pulse applied to the delay 58 reaches the flip-flop 64 to reset it, a shunt activates core 16 causing a pulse to be sent to the gate 60 and to the delay 56. Since the gate 60 is open, the reversible counter 65 counts one increment. Now the first pulse in the group resets the flip-flop 64 and the second pulse sets the flip-flop 64 putting it back into the condition required for the next count as the support 24 moves down with respect to the cores. This process is repeated in exactly the reverse order when the support moves in the opposite direction resulting in pulses being applied to the counter 65 through the gate 62 causing it to count in the opposite direction.

If the support 24 is stopped with respect to the cores and its direction changed, the flip-flop 64 must also be changed. For example, if the support 24 is moving down with respect to the cores and then it stops, the flip-flop 64 will be in the set state. If the support is now moved up, the flip-flop must start in its reset condition in order to count properly. In order to do this the direction reversing pulse that is to be applied to the carrier motor is also applied to terminal 70 which is connected to the reset input terminal of the flip-flop 64. Similarly, if the support is moving up and its direction is reversed, a reversing pulse is applied to the terminal 72 which is connected to the set input terminal of the flip-flop 64.

It can be seen that the transducer generates two output pulses for every position that the carrier moves. However, one of these pulses is blocked by an AND gate and serves only to open a second AND gate to permit a pulse from the other core to be passed to the reversible counter. The outputs from one AND gate indicate a motion in one direction and the outputs from the other AND gate indicate a motion in the opposite direction. The flip-flop 64 and the reversible counter 65 are described in the book Modern Transistor Circuits by John M. Carroll, McGraw-Hill Book Company Inc., 1959, New York. The flip-flop is shown in FIG. 1 on page 236; the counter is shown in FIGS. 6 and 7 on pages 240 and 241 respectively.

It can be seen that the position sensing device of this invention is simple and inexpensive. It is not necessary for the shunts to exert frictional forces against the magnet or the coupling member. This reduces wear and increases reliability. The complete flux path provided by the coupling member permits reliability in operation by increasing the allowable signal. The shunts are inexpensive and easily fabricated. The alignment of the carrier with the platen does not materially affect the behavior of the position detector decreasing the possibilities of errors. This technique enables an inexpensive counter and logic system to provide the control information for a computer to control an output or an output device.

What is claimed is:

1. A detector system for determining the position of a printing head movable along a platen in a tabulating direction from one position to another and return comprising a driven printing head carrier, transducer coil means normally in the path of a magnetic flux circuit inhibiting pulse output from said transducer coil means, a plurality of driven spaced apart shunt members movable together in synchronization with said carrier and successively diverting the magnetic flux to overcome the inhibiting effect of the latter, a reversible and electrically operated binary counter electrically connected to said transducer coil means, a pair of control switches operatively connecting said counter to said transducer coil means, and another control switch operatively connecting said counter to said transducer coil means and controlling said counter mutually with said pair of switches, said another control switch being responsive to the direction of travel of said carrier.

2. A detector system for determining the position of a printing head movable along a platen in a tabulating direction from one position to another and return comprising a driven print head carrier, a pair of transducer coils spaced apart along the path of travel of said carrier and normally in the path of a magnetic flux circuit inhibiting pulse outputs from the coils, a plurality of shunt members movable together and with said carrier and spaced apart along the path of travel, two of said shunt members in any position of said carrier being in staggered relation to said coils and on movement to the next position operable to divert the magnetic flux to overcome the inhibiting effect of the latter, a reversible and electrically operable binary counter electrically connected to each of said coils, a pair of control switches operatively connecting said counter to each of said coils, and another control switch operatively connecting said counter to each of said coils and controlling said counter mutually with said pair of switches, said another control switch being responsive to the direction of travel of said carrier.

3. A detector system for determining the position of a printing head as defined by claim 2 wherein said another control switch is a bistable flip-flop responsive to the direction of travel of said carrier.

4. A detector system for determining the position of a printing head as defined by claim 2 wherein the pair of switches are AND gates connecting said coils to said counter and said another switch is a bistable element connecting said coils to said counter and responsive to the direction of carrier travel.

5. A system for determining the position of a printing head movable along a platen from one position of rest to another and return comprising a stationary permanent magnet having a pair of opposite poles to be spaced along the path of travel of a printing head, a first transducer induction coil overlying a portion of one of said poles in juxtaposition thereto, a second transducer output coil overlying a portion of the opposite one of said poles in juxtaposition thereto, a low reluctance member overlying said coils and said poles on the other side of said coils from said poles, a plurality of shunt members to move with the head and spaced apart along the path of travel, said plurality of shunt members being in staggered relation to said coils when the printing head is at rest and with adjacent shunt members spaced apart a greater distance than the distance between said coils, said magnet and said low reluctance member forming a path for a magnetic flux circuit to inhibit output pulses from said coils until the flux is diverted by a shunt member passing a coil, a reversible binary pulse counter having a first pulse input terminal electrically connected to one of said coils to count pulses generated by movement of said shunt members in one direction and having a second pulse input terminal to count pulses generated by movement of said shunt members in a return direction and electrically connected to said second coil, and a bistable flip-flop switch electrically connected to said coils and to the input terminals of said counter and controlling operation of said counter in response to induction of one of said coils and the direction of travel of said carrier.

6. A detector for determining the position of a movable printing head comprising a printing head carrier movable along a platen in one direction from one position to another and return, a stationary permanent magnet having opposite poles spaced apart along the path of carrier travel, a first magnetic transducer core, an output coil for said core, a second magnetic transducer core, an output coil for said second core, said first and second cores respectively overlying portions of the poles of said magnet in juxtaposition thereto, a low reluctance member overlying the poles of said magnet on the other side of said cores from said poles, a plurality of shunt members movable together and with said carrier along the path of travel of the latter and equally spaced apart along said path between said cores and said low reluctance member, said plurality of shunt members being in staggered relationship to said cores when said carrier is at rest in any one of said positions and adjacent shunts being spaced apart a greater distance than the distance between said cores, said magnet, cores and low reluctance member effecting a magnetic flux circuit when said carrier is at rest to inhibit output pulses from said coils and divertable by said reluctance member, a reversible binary pulse counter having a first input for counting pulses applied thereto when the carrier travels in said one direction and a second input for counting pulses applied thereto when the carrer travels in said return direction, a flip-flop having a set input terminal to receive a pulse for switching the flip-flop to a first state and a reset input terminal to receive a pulse for switching the flip-flop to a second state, a first AND gate having an output electrically connected to said first input of said counter and adapted to be opened when the flip-flop is in said first state, a second AND gate having an output electrically connected to said second input terminal of said counter and being adapted to be opened when said flip-flop is in said second state, said output coil of said first core being electrically connected to said set terminal of said flip-flop and to an input of said first AND gate, and said output of the coil of said second core being electrically connected to the reset input of said flip-flop and to an input terminal of said second AND gate.

References Cited
UNITED STATES PATENTS

| | | |
|---|---|---|
| 2,064,882 | 12/1936 | Brainerd. |
| 2,765,895 | 10/1956 | Higonnet et al. |
| 2,883,108 | 4/1959 | Thornton. |
| 2,936,871 | 5/1960 | Cummins. |
| 3,016,456 | 1/1962 | Corporon. |
| 3,161,387 | 12/1964 | Jutier. |

ERNEST T. WRIGHT, JR., *Primary Examiner.*

U.S. Cl. X.R.

197—82, 176